UNITED STATES PATENT OFFICE.

RUDOLPH BERENDES, OF ELBERFELD, GERMANY, ASSIGNOR TO FARBEN-FABRIKEN VORM. FRIEDR. BAYER & CO., OF ELBERFELD, GERMANY, A CORPORATION OF GERMANY.

MENTHOL COMPOUND.

No. 836,914.   Specification of Letters Patent.   Patented Nov. 27, 1906.

Application filed June 23, 1906. Serial No. 323,134.

*To all whom it may concern:*

Be it known that I, RUDOLPH BERENDES, doctor of philosophy, chemist, a citizen of the German Empire, residing at Elberfeld, Kingdom of Prussia, Germany, have invented new and useful Improvements in New Menthol Compounds, of which the following is a specification.

My invention relates to the production of new pharmaceutical products which are chemically alkyloxy acetyl compounds of menthol, and which according to my researches possess valuable therapeutic properties, being valuable substitutes for menthol without the intense odor and the bad secondary effects of this compound. They are especially qualified for the treatment of migrain, nervous headache, catarrhal affections, &c., and the absence of any odor and taste and their ability of being easily split up into menthol render their outward and internal application highly satisfactory, an average dose being from 0.1 to 1.0 grams.

The process for producing the new compounds consists in treating menthol with alkyloxy acetic acids or derivatives thereof—such as ethoxy or methoxy acetic acid, ethoxy acetyl chlorid, or the like—in such manner as to produce esterification. The new products thus produced are colorless liquids soluble in alcohol and ether. When reacted upon by dilute caustic alkalies, they are split up into alkyloxy acetic acid and menthol.

In carrying out my process practically I can proceed as follows, the parts being by weight: One hundred and fifty-six parts of menthol and seventy-nine parts of pyridin are dissolved in five hundred parts of benzene, and to the resulting solution one hundred and twenty-two and one-half parts of ethoxy acetyl chlorid are added. After the chlorid has entered into reaction the mixture is shaken with dilute hydrochloric acid, which will extract the pyridin, and afterward with water. The benzene solution is then separated from the water and dried. The benzene is driven off and the residue is distilled *in vacuo*.

The new compound thus obtained having the formula $C_{10}H_{19}O-CO-CH_2-OC_2H_5$ is a limpid oil which boils at 153° centigrade under a pressure of about twenty millimeters. It is easily soluble in alcohol and ether and is split up into ethoxy acetic acid and menthol when reacted upon by dilute caustic alkalies.

The process is carried out in an analogous manner on using other alkyloxy acetic acids or derivatives thereof, such as methoxy acetic acid, methoxy acetyl chlorid, or the like.

Having now described my invention and in what manner the same is to be performed, what I claim as new, and desire to secure by Letters Patent, is—

1. The herein-described new alkyloxy acetyl compounds of menthol, obtainable by the action of alkyloxy acetyl chlorid on menthol, being colorless liquids soluble in ether and alcohol; liberating the menthol when reacted upon by dilute caustic alkalies and exhibiting valuable therapeutic properties, substantially as hereinbefore described.

2. The herein-described new ethoxy acetyl menthol having the above-given formula, obtainable by the action of ethoxy acetyl chlorid on menthol, and being a limpid colorless oil boiling at 153° centigrade under a pressure of about twenty millimeters; being soluble in alcohol and ether; being split up into menthol and ethoxy acetic acid when reacted upon by dilute caustic alkalies; and exhibiting valuable therapeutic properties, substantially as hereinbefore described.

In testimony whereof I have hereunto set my hand in the presence of two subscribing witnesses.

RUDOLPH BERENDES.

Witnesses:
  OTTO KÖNIG,
  OTTO BUSCH.